May 6, 1941.  E. A. MACK  2,241,212
INSULATOR PIN REINFORCING BRACKET
Filed May 13, 1939   2 Sheets-Sheet 1

INVENTOR.
Edward A. Mack
BY Chester W. Brown
ATTORNEY.

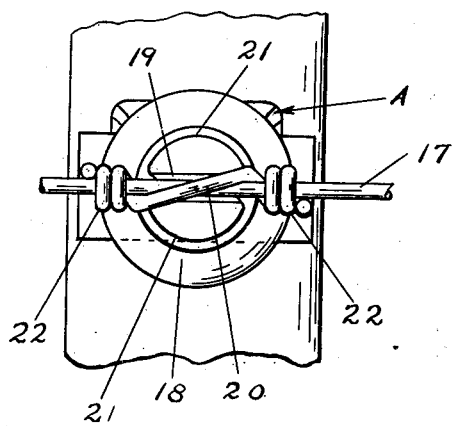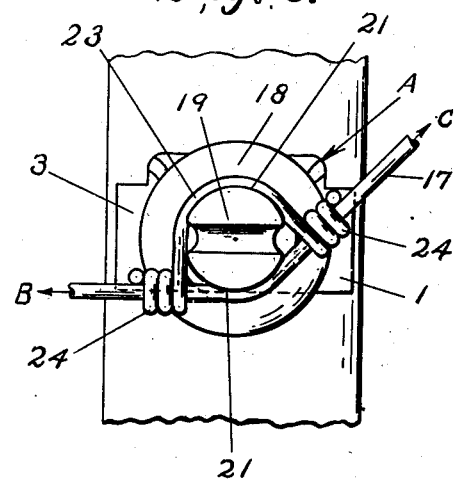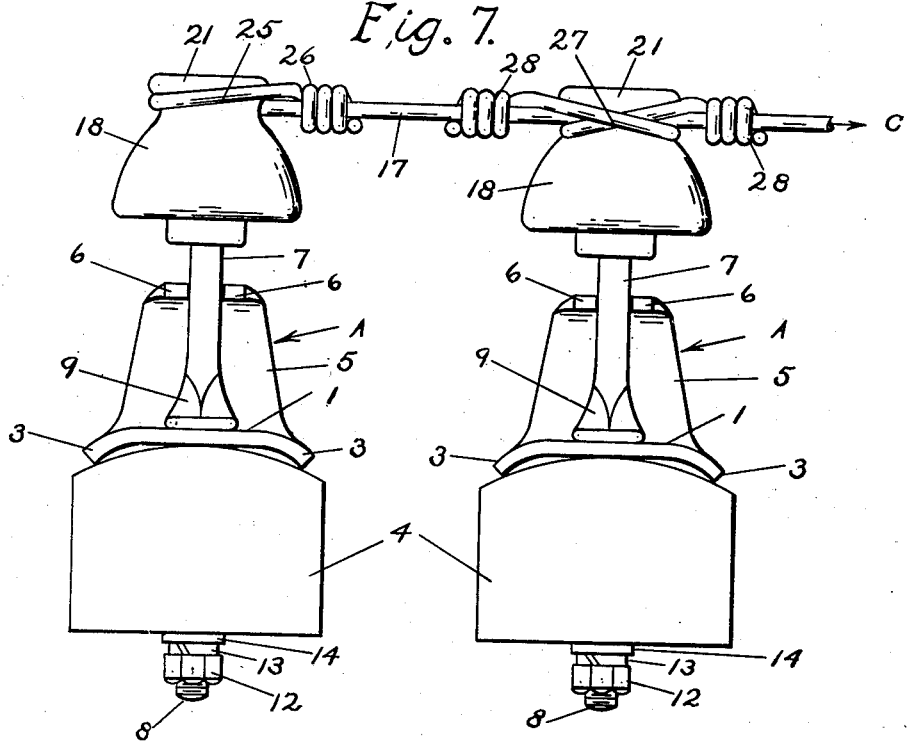

Patented May 6, 1941

2,241,212

UNITED STATES PATENT OFFICE 2,241,212

INSULATOR PIN REINFORCING BRACKET

Edward A. Mack, Huntington, W. Va., assignor to Line Material Company, South Milwaukee, Wis., a corporation of Delaware Application May 13, 1939, Serial No. 273,431

5 Claims. (Cl. 248—220.5)

This invention relates to improvements in reinforcing brackets for insulator pins.

The reinforcing bracket hereafter disclosed is particularly adapted for use on rural distribution lines in which the length of the span between the line-supporting poles approaches that of transmission lines. As a result of this increase in the length of span in rural line construction, conductor vibration and changes in tension frequently stress insulator-supporting pins beyond their predetermined limits of strength.

Accordingly, the principal object of this invention is to provide for a standard insulator pin a reinforcing bracket comprising a single piece of metal for embracing and reinforcing the pin and thereby minimizing distortion of the pin which may otherwise result from stresses produced by a line conductor attached thereto.

It is also an object of this invention to provide a pin-reinforcing bracket which embraces the insulator pin at a point relatively remote from the crossarm upon which such pin may be supported and which affords bearing surface contact on the crossarm approximately conforming to the supporting surface of the crossarm, thereby giving the reinforcing bracket a maximum mechanical advantage against distorting stresses exerted on the pin and preventing injury to the crossarm.

Still another object is to provide for an insulator pin a reinforcing bracket adapted to oppose stresses exerted on the pin by a transmission line supported thereby and extending from the pin in angularly related directions.

In view of the requirement that rural line construction be as inexpensive as possible, it also is an object of this invention to provide a relatively inexpensive reinforcing bracket which may be installed with and secured in place by means of an insulator pin.

In the drawings:

Fig. 5 is a top plan view illustrating the manner in which a straight run of wire is connected to the insulator.

Fig. 6 is a view similar to that shown in Fig. 5 illustrating an angular connection of the wire to the insulator.

Fig. 7 is an end view in side elevation illustrating a manner of dead-ending a span of wire.

Like parts are identified by the same reference characters throughout the several views.

Figure 1:
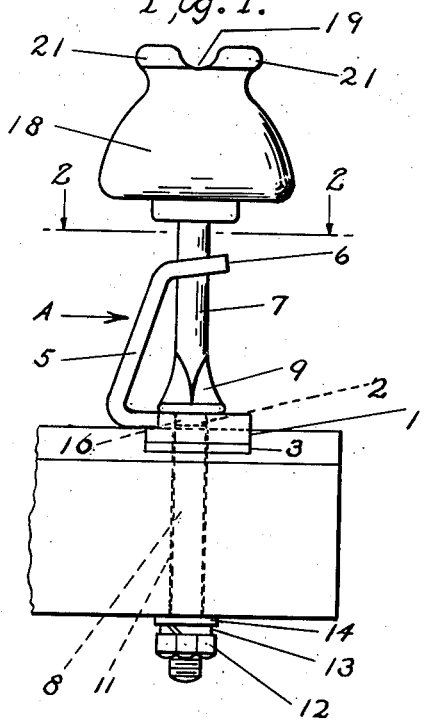
Fig. 1 is a view in side elevation showing a fragmentary portion of a pole crossarm and an embodiment of reinforcing bracket embracing an insulator pin.

The reinforcing bracket A comprises a rectangular-shaped base 1 provided with a centrally-located and elongated rectangular aperture 2 and having its edges 3 bent downwardly into contact with the curved upper surface of the crossarm 4.

Integral with and extending upward from one side of the base portion 1 is a flat arm 5 tapering upwardly and terminating in a pair of spaced horizontally-disposed bracing fingers 6. As indicated, the arm 5 is inclined inwardly over the base portion 1 to dispose the space between the fingers 6 directly above the aperture 2 in the base.

The reinforcing bracket is preferably formed of flat steel stock by a blanking operation which cuts the general outline of the bracket and pierces the necessary aperture 2. Thereafter, the bracket is formed by suitable means into its final shape illustrated in the drawings.

The reinforcing bracket is mounted on the insulator pin 7 by passing the shank 8 of the pin through the aperture 2 until the flange 9 is seated on the base portion 1. Preferably the shank portion 10 disposed in the rectangular aperture 2 is square in cross-section and cooperates with the aperture sides to hold the bracket and pin against relative rotation. When the pin is thus mounted on the bracket, the upper portion of the pin 7 is positioned between the fingers 6. The aperture 2 is elongated in the direction of bracket arm 5 to permit the shank 8 of the pin to be inserted in the aperture from an angular position which will allow the flange portion 9 to pass the bracing fingers 6 when the pin shank 8 is inserted into the aperture.

When the pin and bracket have been assembled in the manner described, the pin shank 8 is inserted in the crossarm hole 11 and secured therein by means of the nut 12. Disposed between the crossarm and nut are a lock washer 13 and standard bearing washer 14.

From the foregoing description and the drawings, it will be apparent that the pin and bracket will be effectively held against rotation relative to each other and to the crossarm by reason of the inter-engagement of the pin shank portion 10 and bracket base 1 and of the bracket base edges 3 and the upper arcuate supporting surface on the crossarm 4.

Fig. 5 illustrates a manner of connecting an intermediate portion of a substantially straight run of conductor 17 to the insulator 18. As shown, the wire 17 extends across the groove 19 in the top of the insulator 18 and is secured therein by means of a tie-wire 20 which extends over the conductor 17 and insulator 18 and is wrapped about the insulator beneath the flange portions 21 and coiled at its ends 22 about the conductor.

Lateral stress exerted on the pin by the conductor 17 is proportional to size of the conductor, the span of the conductor between supporting pins, and the tension of the conductor which varies with weather conditions such as wind, rain and sleet. Such stresses may become sufficient to bend the pin out of its normal position if it is not reinforced. Obviously, the bracket A will, by reason of its engagement with the crossarm 4, the flange 9 on the pin, and the upper portion of the pin, serve as an effective support for the pin against any stresses exerted transversely of the crossarm.

In Fig. 6, the conductor 17 is positioned beneath the flange portion 21 at the lower side of the insulator 18 and is secured therein by means of a tie-wire 23 which is positioned beneath the upper flange portion 21 and engaged at its ends with the conductor 17 by coiled portions 24. As indicated, the conductor 17 extends in the direction B normal to the sides of the crossarm 4 and in the direction C at an angle relative to the sides of the crossarm.

Figure 2:
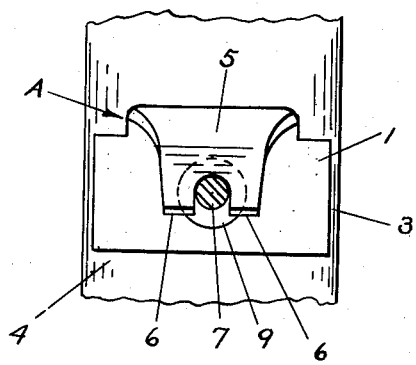
Fig. 2 is a top plan view taken on the line 2—2 of Fig. 1.
Figure 3:
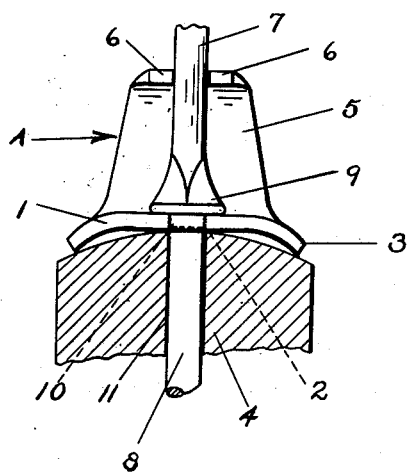
Fig. 3 is a fragmentary view partly in section of the device as seen from the right relative to Fig. 2.
Figure 4:
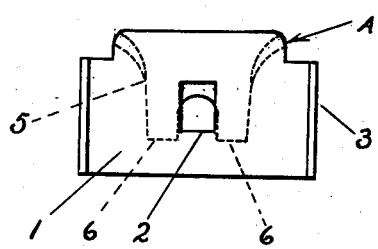
Fig. 4 is a bottom plan view of the reinforcing bracket.

In the Fig. 6 connection, the resultant of the component forces exerted by the conductor on the pin, is in a direction longitudinally relative to the crossarm. Consequently, the pin will tend to bend in the direction of the resultant force. Viewing Figs. 1 and 2, it will be seen that the pin will be braced by the bracket A in all directions of stresses exerted by the Fig. 6 connection because of the contact between the bracket arm 5 and the upper portion of the pin and the contact between the portion 10 on the pin and the margin of the slot 2 on the side of the pin opposite to that upon which the bracket arm is positioned.

The assembly shown in Fig. 7 illustrates a pair of adjacent substantially parallel adjacent crossarms. On each of these crossarms and adjacent each other, is mounted a pin and bracket assembly substantially as previously described. This combination is adapted for dead-ending a long span of conductor which may be attached to both insulators in any suitable manner such as that shown.

In Fig. 7, the end portion 25 of the conductor is wrapped about the insulator at the left of the drawing and portions 21 below the flange and anchored by means of the end 26 coiled about the conductor. The conductor 17 is also connected to the insulator 18 at the right of Fig. 7 by means of a tie wire 27 which is wrapped about the insulator and beneath the flange portions 21 and engaged at its ends 28 with the conductor as indicated.

Thus, in the Fig. 7 dead-end connection, the two insulator pins reinforce each other and are in turn reinforced by the brackets against excessive stress exerted by the conductor.

Preferably, the sides and bottom of the slot disposed between the fingers 6 on the bracket should at all times be substantially in contact with the upper portion of the pin 7 and thereby minimize distortion of the pin in at least three directions and also prevent the pin from applying destructive leverage action directly to the crossarm where it extends through the aperture 11 in the crossarm.

As previously stated, the bracket herein disclosed is adapted to fulfill conditions of electric line installations which require a minimum installation cost without sacrifice in efficient and sturdy construction. The bracket herein disclosed is economical to manufacture and install, obviates the necessity of providing larger insulator pins, and is more efficient in its function than a larger pin at a cost which is less than that required to manufacture and install a larger pin.

From the foregoing, it will be apparent that an insulator pin-reinforcing bracket has been provided in which the stressing forces produced by a conductor attached to the pin and tending to cause bending and other undesirable displacements of the insulator pin, are efficiently and effectively opposed in a simple and economical way.

I claim:

1. In combination with an insulator pin, a reinforcing bracket, said bracket comprising an arcuately-shaped washer portion, a broad flat bracing portion, and a pair of relatively spaced bracing fingers, said fingers being disposed in a plane substantially parallel to said washer portion and extending integrally from said bracing portion, said fingers adapted to bracingly engage said insulator pin.

2. In combination with an insulator pin, a reinforcing bracket, said bracket comprising a base portion apertured centrally thereof and having its end portions beveled downwardly, a wide flat bracing portion integrally extending upwardly from said base portion and a pair of relatively spaced bracing fingers integrally extending from said bracing portion and adapted to brace said pin in substantially all directions through a 180° angle disposed upon the side of said pin adjacent said arm.

3. In combination with an insulator pin, a reinforcing bracket, said bracket comprising a base portion apertured centrally thereof and having its end portions beveled downwardly, a tapered bracing portion integrally extending upwardly from said base portion and a pair of relatively spaced bracing fingers integrally extending from said bracing portion, said aperture and fingers aligned to receive said insulator pin in bracing position at right angles to said base portion.

4. The combination with an insulator pin including a shank having a flange intermediate its ends, of a reinforcing bracket including a base having an aperture receiving and holding said shank in non-rotative relationship to said base, said base engaging said flange on one side thereof, an arm extending upwardly from said base, and spaced fingers engaged with said shank upon opposite sides thereof at a position disposed on the other side of said flange, said base, arm and fingers comprising an integral unit.

5. The combination with an insulator pin including a shank having a flange intermediate its ends, of a reinforcing bracket including a base having an aperture receiving said shank, said base engaging said flange on one side thereof, an arm extending upwardly from said base, and spaced fingers engaged with said shank upon opposite sides thereof at a position disposed on the other side of said flange, said base, arm and fingers comprising an integral unit.

EDWARD A. MACK.